(12) United States Patent
Pellow et al.

(10) Patent No.: US 10,467,720 B2
(45) Date of Patent: Nov. 5, 2019

(54) SYSTEM, METHOD, AND NON-TRANSITORY COMPUTER-READABLE STORAGE MEDIA RELATED TO CONCURRENT PRESENTATION OF RETAIL FACILITY MAPS

(71) Applicant: Wal-Mart Stores, Inc., Bentonville, AR (US)

(72) Inventors: Benjamin Pellow, Oakland, CA (US); Emily Poplawski, Palo Alto, CA (US); Stephen Aase, Boise, ID (US)

(73) Assignee: WALMART APOLLO, LLC, Bentonville, AR (US)

( * ) Notice: Subject to any disclaimer, the term of this patent is extended or adjusted under 35 U.S.C. 154(b) by 667 days.

(21) Appl. No.: 15/010,449

(22) Filed: Jan. 29, 2016

(65) Prior Publication Data
US 2017/0221170 A1    Aug. 3, 2017

(51) Int. Cl.
| G06Q 30/00 | (2012.01) |
| G06Q 90/00 | (2006.01) |
| G06Q 30/02 | (2012.01) |
| H04W 4/021 | (2018.01) |
| H04W 4/04 | (2009.01) |
| H04W 4/33 | (2018.01) |
| H04W 4/029 | (2018.01) |

(52) U.S. Cl.
CPC ......... *G06Q 90/20* (2013.01); *G06Q 30/0261* (2013.01); *H04W 4/021* (2013.01); *H04W 4/029* (2018.02); *H04W 4/043* (2013.01); *H04W 4/33* (2018.02)

(58) Field of Classification Search
USPC ............................................... 705/14.1, 14.4
See application file for complete search history.

(56) References Cited

U.S. PATENT DOCUMENTS

| 6,844,821 B2 | 1/2005 | Swartzel et al. | |
| 2006/0265294 A1* | 11/2006 | de Sylva | G06Q 10/087 705/28 |
| 2007/0281689 A1* | 12/2007 | Altman | G06Q 30/0207 455/435.1 |
| 2008/0228600 A1* | 9/2008 | Treyz | G06Q 20/12 705/26.43 |

(Continued)

OTHER PUBLICATIONS

Utility U.S. Appl. No. 15/010,354, filed Jan. 29, 2016 entitled "System, Method, and Non-Transitory Computer-Readable Storage Media Related to Re-Stocking Maps".

(Continued)

*Primary Examiner* — Sun M Li
(74) *Attorney, Agent, or Firm* — Bryan Cave Leighton Paisner LLP (57) ABSTRACT

Techniques related to concurrent presentation of retail facility maps are disclosed. The techniques involve acquiring tracking data relating to a location of a mobile device in a retail facility and acquiring, using for a search engine module, map data relating to a layout of the retail facility. A first map based on the map data is presented on a display of the mobile device. The first map comprises an entirety of the layout. A second map based on the map data and tracking data is concurrently presented on the display of the mobile device. The second map comprises a zoomed-in portion of the layout that is proximate to the location of the mobile device.

20 Claims, 6 Drawing Sheets

(56) References Cited

U.S. PATENT DOCUMENTS

| | | | |
|---|---|---|---|
| 2012/0226391 A1* | 9/2012 | Fryer | G08G 1/202 |
| | | | 701/1 |
| 2014/0274107 A1* | 9/2014 | Rados | G06F 17/30241 |
| | | | 455/456.1 |
| 2016/0203429 A1 | 7/2016 | Mellott et al. | |
| 2017/0220983 A1 | 8/2017 | Pellow et al. | |
| 2017/0221119 A1 | 8/2017 | Pellow et al. | |

OTHER PUBLICATIONS

Utility U.S. Appl. No. 15/010,394, filed Jan. 29, 2016 entitled "Database Mining Techniques for Generating Customer-Specific Maps in Retail Applications".

\* cited by examiner

SYSTEM, METHOD, AND NON-TRANSITORY COMPUTER-READABLE STORAGE MEDIA RELATED TO CONCURRENT PRESENTATION OF RETAIL FACILITY MAPS

FIELD OF THE DISCLOSURE

U.S. Patent Classification Primary Class: 707 (DATA PROCESSING: DATABASE, DATA MINING, AND FILE MANAGEMENT OR DATA STRUCTURES). Art Unit: 2161.

The disclosure is related to search engines, and more particularly, to systems, methods, and computer-readable storage media that perform a search request to mine various databases for retail applications.

BACKGROUND

Many retail stores offer tens thousands of goods for sale to the consumers. To offer such a substantial amount of goods in one store, retailers require stores of considerable size. For example, some stores include hundreds of aisles to store the goods. Given the size of such retail stores, consumers may find difficulty navigating the store to locate goods, entrances and exits, registers, restrooms, popular departments, and the like. Furthermore, the larger the retail store, the more difficulty the consumer typically encounters. As such, consumer satisfaction with the retail store may decrease if the consumer encounters such difficulty.

There have been attempts to offer consumers an indoor map for mobile device apps, which shows contextual information, such as the location of goods, in relation to the floor plan of the store. Such conventional maps can be zoomed-in by the consumer to focus the map on a specified area in the store. However, because the retail environment is so large, the zoomed-in area provides the consumer with substantially restricted perspective of the store, as a whole, (e.g., only about 8-10 aisles or 2.5% of the store). Moreover, when such conventional maps are zoomed-in, the useful contextual information otherwise present on the map when zoomed-out is obscured. For at least this reason, conventional maps are often inconvenient, inefficient, and incomplete, thereby increasing the difficulty of store navigation and causing consumer dissatisfaction.

The present invention is aimed at one or more of the problems identified above.

SUMMARY OF THE INVENTION

In one embodiment, a server is provided. The server comprises a search engine module being configured to receive tracking data relating to a location of a mobile device in a retail facility. The search engine module is configured to acquire map data relating to a layout of the retail facility. A processor is configured to generate for presentation on a display of the mobile device a first map based on the map data, wherein the first map comprises an entirety of the layout. The processor generates for concurrent presentation on the display of the mobile device a second map based on the map data and tracking data. The second map comprises a zoomed-in portion of the layout that is proximate to the location of the mobile device.

In other embodiments, a computer-implemented method is provided. The computer-implemented method includes the steps of acquiring, with a search engine module, tracking data relating to a location of a mobile device in a retail facility and map data relating to a layout of the retail facility. A first map based on the map data is presented on a display of the mobile device using a processor. The first map comprises an entirety of the layout. A second map based on the map data and tracking data is concurrently presented on the display of the mobile device using the processor. The second map comprises a zoomed-in portion of the layout that is proximate to the location of the mobile device.

In still other embodiments, one or more non-transitory computer-readable storage media have computer-executable instructions embodied thereon. When executed by at least one processor, the computer-executable instructions cause the processor to process tracking data relating to a location of the mobile device in a retail facility and process map data relating to a layout of the retail facility. The computer-executable instructions cause the processor to facilitate for presentation on a display of the mobile device a first map based on the map data, wherein the first map comprises an entirety of the layout. The computer-executable instructions cause the processor to facilitate for concurrent presentation on the display of the mobile device a second map based on the map data and tracking data. The second map comprises a zoomed-in portion of the layout that is proximate to the location of the mobile device.

The server, computer-implemented method, and non-transitory computer-readable storage media are configured to provide indoor map capabilities for mobile device apps, wherein consumers are concurrently provided with the first map and the second map in a Picture-in-Picture type configuration. The first map displays an overview of the retail facility's entire layout while the second map is a zoomable full screen map provided underneath the first map. This technique provides the consumer access to the zoomed-in area provided in the second map while simultaneously providing an unrestricted perspective of the entirety of the facility in the first map. Moreover, the server, computer-implemented method, and non-transitory computer-readable storage media advantageously provide the ability to zoom-in the second map to focus the second map on a specified area in the retail facility, while at the same time provide useful contextual information, such as the location of goods, entrances and exits, registers, restrooms, popular departments, unobscured on the first map. For at least this reason, the server, computer-implemented method, and non-transitory computer-readable storage media advantageously provide an efficient, complete, and dynamic mapping capability thereby reducing the difficulty of retail facility navigation and increasing user satisfaction.

BRIEF DESCRIPTION OF THE FIGURES

Other advantages of the present disclosure will be readily appreciated, as the same becomes better understood by reference to the following detailed description when considered in connection with the accompanying drawings wherein.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. In addition, common but well-understood elements that are useful or necessary in a commercially feasible embodiment are often not depicted in order to facilitate a less obstructed view of these various embodiments of the present invention.

DETAILED DESCRIPTION

A. System and Method Overview

Figure 1:
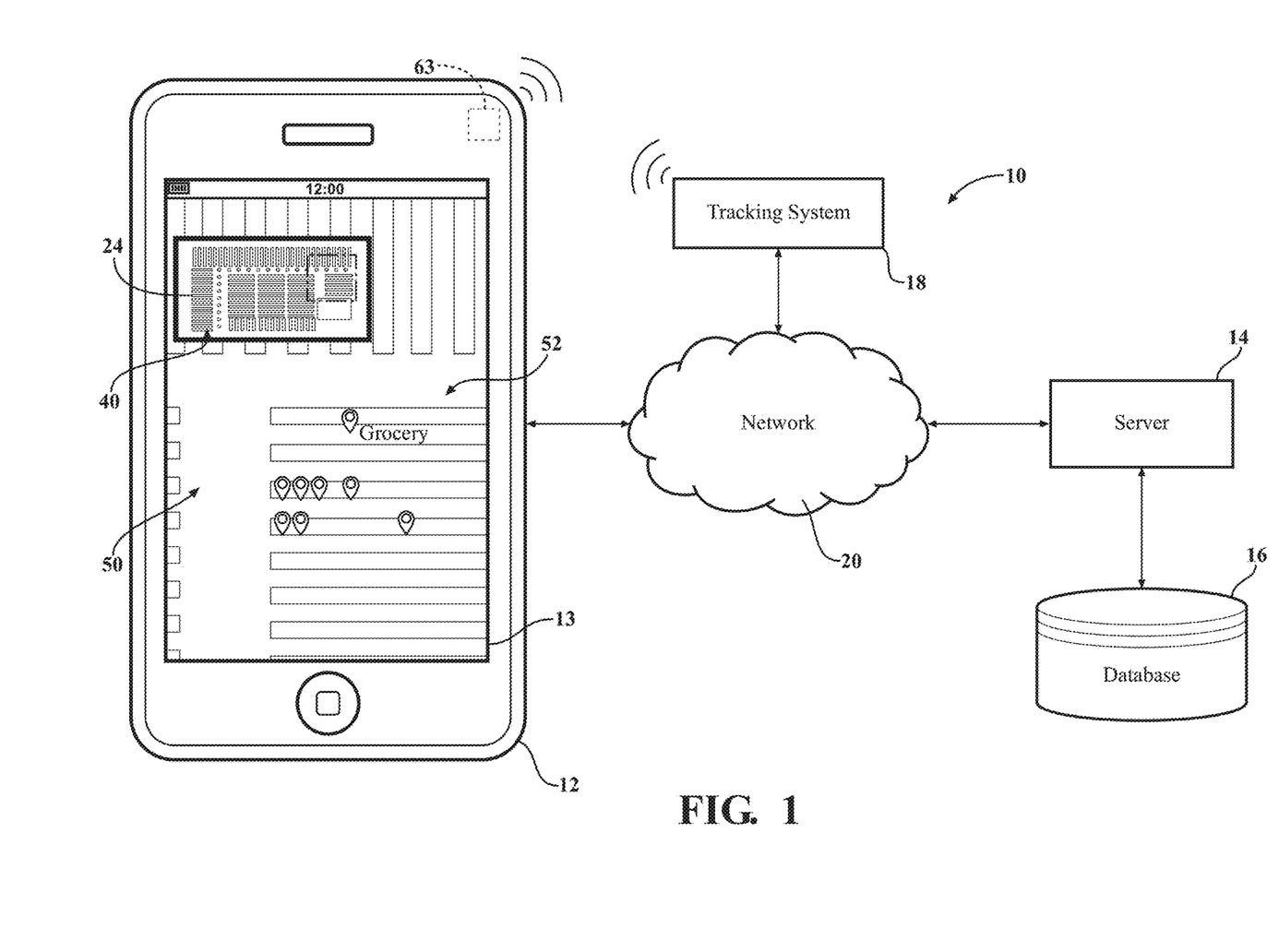
FIG. 1 is a schematic illustration of a system for providing concurrent presentation of retail facility maps, according to one embodiment of the present invention.

Referring to the Figures, wherein like parts or components are identified using like numerals throughout the several views, one example of a system 10 is provided in FIG. 1. The system 10 is utilized for a retail environment. The system 10 includes a mobile device 12, a server 14, a database 16, and a tracking system 18. The mobile device 12, server 14, and tracking system 18 can communicate with another through a network 20.

Other features of the system 10 can be found in commonly owned U.S. Patent Application 15/010,394, filed on Jan. 29, 2016 and commonly owned U.S. Patent Application 15/010,354, filed on Jan. 29, 2016 which are hereby incorporated by reference in their entirety.

Figure 2:
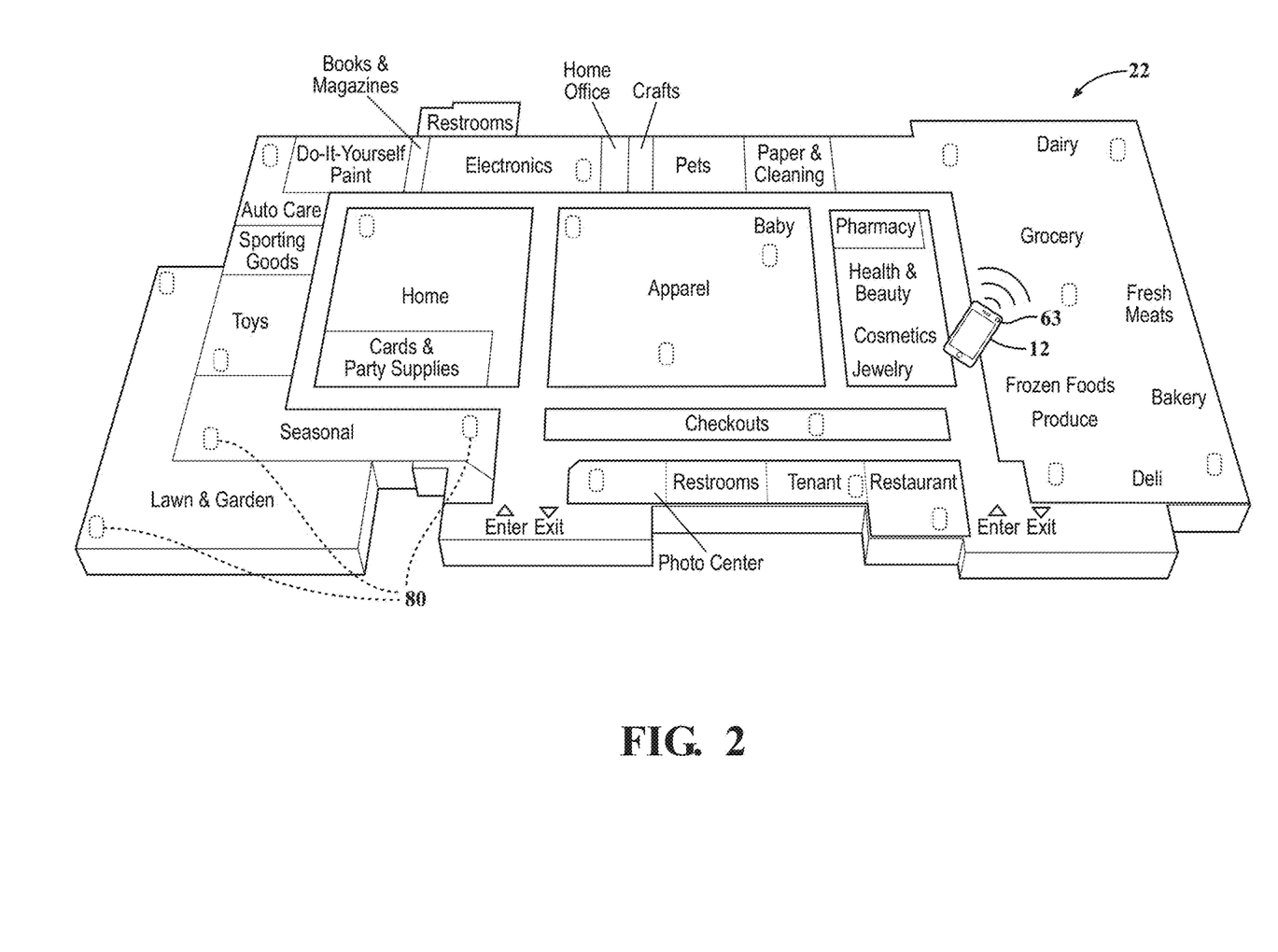
FIG. 2 is diagrammatic illustration of a layout of a retail facility, according to one example.

As shown in FIG. 2, a retailer operates a retail facility 22. As used herein, the term "retail facility" may refer to any store, business or a combination of businesses that sells and/or offers to sell products or services to a consumer. Examples of a retail store include grocery stores, malls, department stores, convenient stores, etc. The retail facility 22 may be representative of a larger corporate environment, which may provide many avenues of interface with the consumer.

The retail facility 22 comprises a layout 24, such a floor plan, defining, to approximate scale, the position and location of any suitable structures, areas, and objects within the facility 22. For example, the layout 24 may define the position and location of aisles, departments, restrooms, exits, entrances, parking areas, restaurants, services, e.g., CPA/tax assistance, pharmacy, optometrist), and the like. These structures, areas, and objects are defined within a perimeter of the layout 24, which represents the exterior wall of the facility 22. Typically, each retail facility 22 comprises its own layout 24. In some instances, retail facilities 22 may include common layouts 24. The layout 24 of the facility 22 is stored in an electronic format and in mediums, such as the database 16 for example, to facilitate the techniques herein.

For example, one electronic format may include WTK (well known text) objects in a Structured Query Language (SQL) database.

The mobile device 12 is operated or possessed by an individual. The individual is typically a consumer interested in purchasing goods from the retailer. The term "consumer" may refer to a person that enters a retail store. However, the individual may be any individual capable of using the techniques described herein. For example, the individual may be an employee, contractor, service provider, or the like. The individual accesses the retail facility 22 with the mobile device 12. That is, the mobile device 12 enters the retail facility 22, as shown in FIG. 2. The individual may carry the mobile device 12 while running errands such as grocery shopping, visiting an auto-repair shop, purchasing office supplies, purchasing clothes or any other products sold by a retail store or having a service performed by the retail store. In one example, the individual is a personal shopper for services wherein consumers specify products for purchase electronically ahead of time and employees search the retail facility 22 to collect the products for purchase such that the consumer can simply pick up the collected products, rather than shop around the facility 22 in search of such.

The mobile device 12 comprises, or is in communication with, a display 13. The display 13 allows the presentation of information to assist the individual in navigating the retail facility 22.

The tracking system 18 is disposed at the retail facility 22 and generates or provides tracking data relating to a location of the mobile device 12 in the retail facility 22. That is, as the mobile device 12 is moved throughout the retail facility 22, the tracking system 18 is configured to provide the tracking data indicating where, in relation to the retail facility the mobile device is located. In one embodiment, as shown in FIG. 2, the tracking system 18 accomplishes tracking of the mobile device 12 using communication units (e.g., beacons or transponders) disposed throughout the facility 22.

Figure 3:
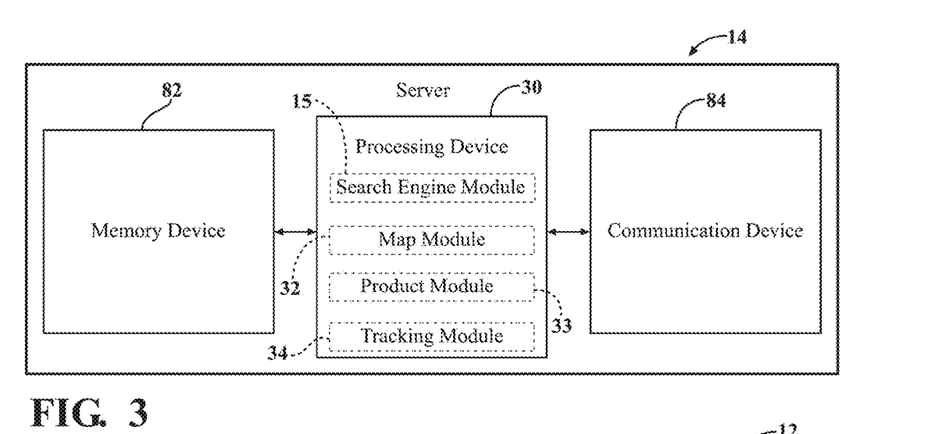
FIG. 3 is a block diagram of a server of the system, according to an embodiment of the present invention.

Referring to FIG. 3, the server 14 comprises at least one processing device 30 according to one embodiment. The processing device 30 is in communication with a search engine module 15. In some embodiments, the search engine module 15 may be partitioned into, or supplemented by a map module 32 and a tracking module 34. The tracking module 34 is configured to receive the tracking data relating to the location of a mobile device in the retail facility 22. The map module 32 is configured to generate map data relating to 24 layout of the retail facility 22. As used herein, the term "map" may refer to map information that is a digital representation of the layout of the retail facility 22. The map data may include data such as a map of a retail store, parking lot, mall, etc. associated with the retail store. The map data may be depicted as a map with boundaries for aisles and walls, a grid reference system, a blank layout of a retail store, and the like. The map module 32 may retrieve the layout 24 of the facility 22 from the database 16.

In one embodiment, the processing device 30 facilitates for presentation on the display 13 of the mobile device 12 a first map 40 based on the map data. As shown generally in FIG. 1, the first map 40 comprises an entirety of the layout 24. Concurrently, the processing device 30 facilitates for presentation on the display 13 of the mobile device 12 a second map 50 based on the map data and tracking data. The second map 50 comprises a zoomed-in portion 52 of the layout 24 that is proximate to the location of the mobile device 12. This allows the individual to see a detailed view of the zoomed-in portion 52 in the second map 50 while simultaneously seeing the entirety of the facility 22 in the first map 40 for context.

Figure 6:
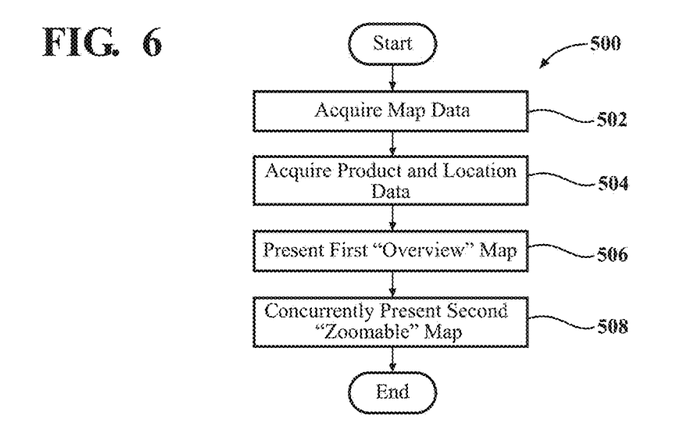
FIG. 6 is a flow diagram of a method for providing concurrent presentation of retail facility maps, according to one embodiment of the present invention.

FIG. 6 illustrates the computer-implemented method 500 for performing the mapping techniques described herein. At operation 502, map data relating to the layout 24 of the retail facility 22 is acquired. At operation 504, tracking data relating to the location of a mobile device 12 in the retail facility 22 is acquired. Step 504 may optionally include acquiring product data relating to the identity and/or location of products offered for sale at the facility. At operation 506, the first map 40 based on the map data is presented on the display 13 of the mobile device 12. At operation 508, the second map 50, based on the map data and tracking data, is concurrently presented on the display 13 of the mobile device 12.

In one embodiment, any of the server 14, database 16, and tracking system 18 are operated by the retailer. Alternatively, any of the server 14, database 16, and tracking system 18 may be operated by a third party on behalf of, or employed by, the retailer. Any of the server 14, database 16, and tracking system 18 may be physically located at the retail facility 22. Alternatively, any of the server 14 and database 16 may be physically located at a site that is remote from the retail facility 22. Furthermore, the tracking system 18 may be implemented entirely within the mobile device 12.

Embodiments in accordance with the present invention may be embodied as a system, server, computer-implemented method, or computer program product. Accordingly, the present invention may take the form of an entirely hardware embodiment, an entirely software embodiment (including firmware, resident software, micro-code, etc.), or an embodiment combining software and hardware aspects that may all generally be referred to herein as a "module" or "system." Furthermore, the present invention may take the form of a computer program product embodied in any tangible media of expression having computer-usable program code embodied in the media.

Various aspects and embodiments of the techniques, methods, and components summarized in this section are explained in detail below.

B. Mobile Device

Mobile device 12 may be a portable device, wherein at least some or all of its components are formed together in a single device, which can be carried around by a person. The mobile device 12 may include any suitable device, including, but not limited to, a portable computer, a laptop or notebook computer, personal desktop assistant (PDA), a tablet, a handheld mobile device including a cellular telephone, Smartphone, Netbook, and the like.

Figure 4:
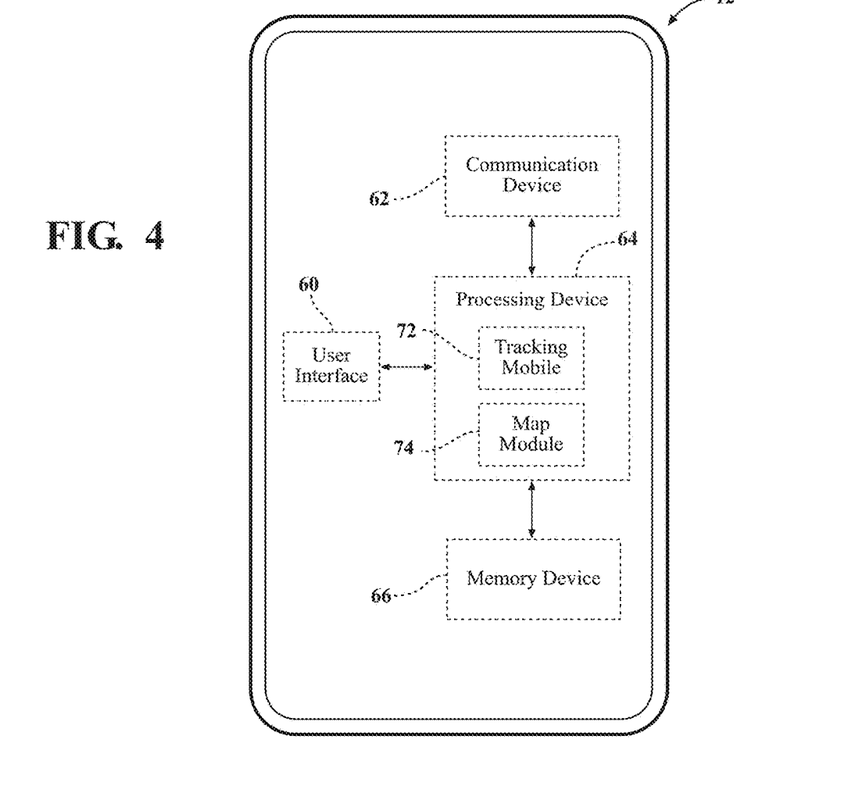
FIG. 4 is a block diagram of a mobile device of the system, according to an embodiment of the present invention.

FIG. 4 illustrates one embodiment of the mobile device 12. The mobile device 12 may include a user interface 60, a communication device 62, a processing device 64, and a memory device 66. Mobile device 12 includes any portable electronic device having the processing device 64 for executing applications on the user interface 60 displaying information processed by the processing device 64.

On example of the user interface 60 is the aforementioned display 13, which can use any of a variety of types of display technologies, such as a liquid crystal display (LCD), a cathode-ray tube type display, an electronic ink display, a light emitting diode (LED) type display such as an OLED display, a plasma display, or the like.

In one example, the mobile device 12 includes a graphical user interface (GUI) 68 displaying the first and second maps 40, 50. GUI 68 may include a plurality of input objects, which allow the consumer to provide commands to the mobile device 12. For example, GUI 68 may include an input to initiate tracking of mobile device 12, although it should be understood that the tracking of mobile device 12 may occur automatically or via commands received from tracking system 18 without any input from the consumer. GUI 68 may also include an input to determine the style of the first and second maps 40, 50 that the consumer desires to display on GUI 68. Alternatively, the server 14 may select the style of first and second maps 40, 50 to be displayed on GUI 68 without any input from the consumer. GUI 68 may also include input to select a retail facility that the consumer is currently within or about to be within. Similarly, the sever 14 may automatically detect the retail facility 22 based on, for example, the tracking data.

In general, the GUI 68 is embodied in a software application ("app") that is run by the mobile device 12. The app is any suitable type of software program that facilitates performance of the techniques described herein. The app is commonly referred to as a mobile app. The app may be pre-installed on the mobile device 12 or downloaded to the mobile device 12 using the internet. In one embodiment, the app is developed, administered, and provided by the retailer of the facility. The app is utilized using the native components of the computing device 12, such as the user interface 60, the communication device 62, the processor 64, and the memory device 66. In some embodiments, the app is hosted by the server 14. Those skilled in the art appreciate that the app may have any suitable configuration without departing from the scope of the invention.

The mobile app may receive content for presentation to the consumer on the display 13 of mobile device 12, or use such content in other functionality performed by mobile app on mobile device 12.

Figure 5:
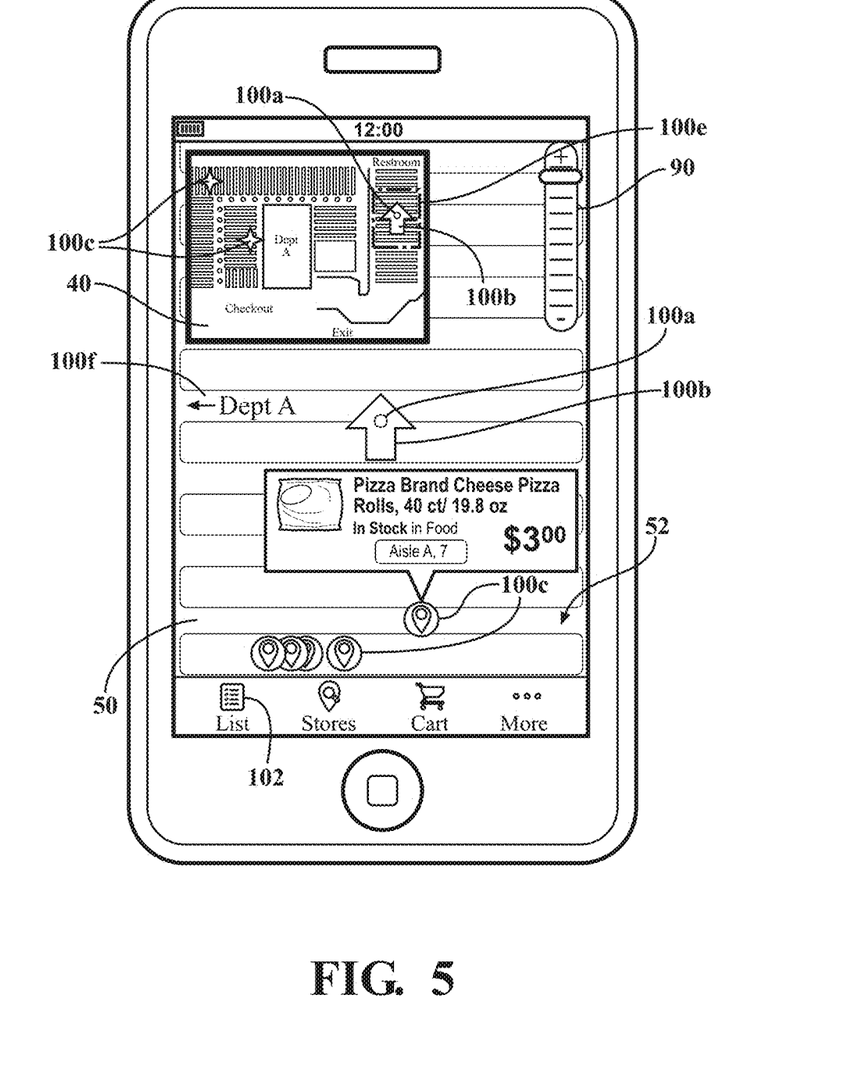
FIG. 5 is a sample screenshot of the display of the mobile device concurrently presenting first and second maps of the retail facility, according to an embodiment of the present invention.

FIG. 5 illustrates one example of the mobile phone 12 presenting the second map 50 on the display 13. In FIG. 5, the GUI overlays any suitable contextual information 70 relating to the retail facility 22 on the second map 50. Such contextual information may include, for example, the location of goods, entrances and exits, registers, restrooms, and/or departments (e.g., Dept A), relative to the layout 24 of the facility 22. Other examples of contextual information 70 include, but are not limited to, position/location, directional or orientation data relating to the mobile device 12 in relation to the layout 24, or advertising or promotional information relating to an item for sale at the facility 22. Other contextual information 70 may include indicators associated with the route taken by the individual through the facility 22 and/or the length of time the mobile device 12 was at different locations within the retail facility 22. Any of the aforementioned contextual information 70 may be presented according to any suitable color, style, shape, and the like.

The GUI 68 may overlay any suitable contextual information 70 or data on any one of the first and second maps 40, 50 simultaneously or separately. In general, the GUI 68 is embodied in a software application or "app" that is run by the mobile device 12.

The communication device 62 is in communication with the processing device 64 and is capable of sending and receiving information between one or more other computers in communication with the mobile device 12. In some embodiments, the communication device 62 communicates with a wireless communications unit such as, e.g., a wireless router or wireless access point that provides a wireless network (wireless network or Wi-Fi). Communication device 62 allows mobile device 12 to communicate with another device, e.g., tracking system 18, via the network 20.

Communication device 62 can include one or more wireless transceivers for performing wireless communication and/or one or more communication ports for performing wired communication. The communication device 62 allows the mobile device 12 to receive/send information or data to facilitate generation of the maps 40, 50.

The mobile device 12 is in communication with the server 14, and/or the tracking system 18 via any suitable network 20. In some embodiments, the mobile device 12 may communicate with the server 14 or the tracking system 18 over a cellular data network. In other embodiments, the tracking system 18 is contained within the mobile device 12 and is accessed through the app.

Memory device 66 is a device that stores data generated or received by the mobile device 12. Memory device 66 can include, but is not limited to, a hard disc drive, an optical disc drive, and/or a flash memory drive. Memory device 66 may be a file store, memory or some other storage medium configured to store physical components to support the mobile app, such as components associated with a graphical user interface, map data, tracking data, and the like. The memory device 66 may include memory, e.g., read only memory (ROM) and random access memory (RAM), storing processor-executable instructions.

The mobile device 12 may include any other suitable drives and associated computer readable memory medium to provide storage of computer readable instructions, data structures, program modules and other data for the mobile device 12. Drives can include an operating system, application programs, program modules, and program data.

In some embodiments, the processing device 50, as described herein, includes any programmable system including systems and microcontrollers, reduced instruction set circuits (RISC), application specific integrated circuits (ASIC), programmable logic circuits (PLC), and any other circuit or processor capable of executing the functions described herein. The above examples are exemplary only, and thus are not intended to limit in any way the definition and/or meaning of the term processor. In embodiments where the processing device 50 includes two or more processors, the processors can operate in a parallel or distributed manner.

The mobile device 12 further includes any suitable input devices through which data may enter the mobile device 12, either automatically or by a user who enters commands and data. Input devices can include an electronic digitizer, a flatbed scanner, a barcode reader, a microphone, a camera, a video camera, a keyboard and a pointing device, commonly referred to as a mouse, a trackball or a touch pad, a pin pad, any USB device, any Bluetooth enabled device, an RFID or NFC device, and a debit card reader. Other input devices may include a joystick, game pad, scanner, touch screen and the like. In one or more embodiments, input devices are portable devices that can direct display or instantiation of applications running on processing device 64. The mobile device 12 may further include any suitable sensors for facilitating tracking of the location, movement, direction or orientation of the mobile device 12. Such sensors may include gyro-sensors, accelerometers, or the like.

As shown in FIG. 4, the processing device 50 of the mobile device 12 may execute the search engine module 15, which may include, or work in conjunction with a tracking module 72, and a map module 74. The tracking module 72 and map module 74 may be implemented, in part, by a software application or "app" running on the processing device 64 of the mobile device 12. In some embodiments, the tracking module 72 and map module 74 may replace the search engine module 15.

The tracking module 72 allows the mobile device 12 to determine its location. Tracking module 72 may include devices such a Global Positioning System (GPS) based device, and methods such as using radio triangulation to determine the location of the mobile device 12.

The tracking module 72 can determine the location of the mobile device 12 with any suitable wireless communications protocol, such as Near Field Communications (NFC), bluetooth, and/or wireless Local Area Network (Wi-Fi). For example, as described below, the tracking module 72 may cooperate with one or more wireless communication units 80 associated with the tracking system 18 of the retail facility 22 to track location of the mobile device 12.

The mobile device 12 may also use tracking module 34 to communicate with tracking system 18. In response, tracking system 18 may transmit content associated with deploying, executing, and supporting tracking of the mobile device 12.

Mobile device 12 may transmit tracking data associated with mobile device 12 to the server 14 or tracking system 18 along with corresponding timestamps. Tracking system 18 may store the tracking data along with the timestamp. As described below, tracking data may include location, direction and orientation data. Mobile device 12 may locally store the tracking data and timestamps in the memory device 66.

In other embodiments, the tracking module 72 and/or map module 74 on the mobile device 12 may alternatively or additionally be implemented as at least one application programming interface (API). The API is a set of routines, protocols, callable methods, or tools specifying how software components should interact. The API may allow embedding of information (e.g., images, video, data) relating to the map data 26 and/or tracking data 30 into the first and second maps 40, 50 or other functionality of the app. The API(s) may utilize any suitable interface, such as a JavaScript or Flash interface. The API(s) is configured to accesses any of the database(s) 16 or computer hardware like hard disk drives or video cards. The API(s) are used with GUI 68 and can facilitate integration of features into the app, thereby implementing a "plug-in API". The API(s) can also assist with sharing data, which can help to integrate and enhance the functionalities of the app. The APIs 80 may be in communication with and/or controlled by the app to facilitate generation of the first and second maps 40, 50. The APIs may be stored in the memory device 66 of the computing device 12 and/or the memory device 82 of the server 14. Any of the processing devices 30, 64 processor may execute the APIs. Those skilled in the art appreciate that the API(s) may have other configurations not specially recited herein without departing from the scope of the invention.

In an example embodiment, mobile device 12 may receive a timestamp corresponding to the time the mobile device 12 was positioned at a location in a retail facility 22. A location can be represented in geographic coordinates, Cartesian coordinates, e.g., an (x, y) point if the facility 22 is divided into a Cartesian plane, and/or can be represented by referencing points of interest, e.g., "aisle 3, 20 feet from the front of the retail store." Mobile device 12 may transmit and/or receive tracking data at a desired time interval, which may be a time period that is less than a second, every second, every five seconds, etc. Sometimes, both Cartesian and geographic coordinates may be used, and reference points are used to translate between coordinate systems.

Those skilled in the art appreciate that the mobile device 12 may have various other configurations not specifically described herein for implementing any of the techniques described herein.

C. Server and Database

With reference to FIG. 3, the system 10 includes the server 14 to facilitate generation of the first and second maps 40, 50. In one embodiment, the server 14 may be a stand-alone computer that is located at the retail facility 22. Alternatively, the server 14 may be located remote from the retail facility 22. The server may access the data stored on the database 16.

In one embodiment, the server 14 comprises the processing device 30 having map module 32 and 34. The processing device 30 in the server 14 can communicate with a memory device 82 and a communication device 84.

The server processing device 30 can include memory, e.g., read only memory (ROM) and random access memory (RAM), storing processor-executable instructions and one or more processors that execute the processor-executable instructions. In embodiments where the server processing device 30 includes two or more processors, the processors can operate in a parallel or distributed manner. The server processing device 30, as described herein, includes any programmable system including systems and microcontrollers, reduced instruction set circuits (RISC), application specific integrated circuits (ASIC), programmable logic circuits (PLC), and any other circuit or processor capable of executing the functions described herein. The above examples are exemplary only, and thus are not intended to limit in any way the definition and/or meaning of the term processor. In an example, the server processing device 30 may host the mobile app provided on the mobile device 12.

The server communication device 84 allows the server 14 to communicate with another device, e.g., the mobile device 12, tracking system 18, and the like, via any suitable network 20. The server communication device 84 can include one or more network interfaces and/or wireless transceivers for performing wireless communication and/or one or more communication ports for performing wired communication. The map data and tracking data may be transmitted or received with the communication device 84.

The server memory device 82 stores data generated or received by the first server 24. For example, the server memory device 82 may store the map data relating to the retail facility 22 and the tracking data relating to the mobile device 12. The server memory device 82 can include, but is not limited to a hard disc drive, an optical disc drive, and/or a flash memory drive. Further, the server memory device 82 may be distributed and located at multiple locations. The server memory device 82 is accessible to the processing device 30. In some embodiments, the server memory device 82 stores data in the database 16.

Map module 32 may be configured to obtain maps corresponding to the layout 24 of any one of a plurality of retail facilities 22. Map module 32 may receive the layout 24 from a plurality of sources such as the retail facility 22 itself, a partner of a retail facility 22, the internet, or any other source of map information. In some embodiments, map module 32 includes maps that include a specific layout of retail facility 22 including product placement indicators, size of different departments, and/or aisles of the retail facility 22. Map module 32 may also be configured to receive maps that only have a limited layout of the retail store including the positioning of the walls of the retail store. In one embodiment, map module 32 may receive the map data from tracking system 18 or third party data services. Map module 32 may store the location and map data of the retail facility 22 in the server database 16.

Map module 32 may be configured to enable presentation of map data associated with the retail facility 22 on GUI 68. Map module 32 may query the map database 16 using tracking data associated with the mobile device 12, e.g., RTLS coordinates, or a general location, e.g., postal zip code or city/state, and automatically determine the retail facility 22 where mobile device 12 is located and the corresponding layout 24 of the retail facility 22. Map module 32 may be configured to overlay the contextual information 70 on the layout 24.

Tracking module 34 may be configured to transmit and/or receive tracking data, such as coordinates of mobile device 12 and a corresponding timestamp, at various time periods. The tracking module 34 can make determinations about tracking the mobile device 12 in order to facilitate rendering of the appropriate maps 40, 50. The tracking module 34 may work in conjunction with the map module 32 to link the tracking data to the map data. The tracking module 34 may instruct to storage of tracking data in the server memory device 82.

In some embodiments, the tracking module 34 may determine a current location of mobile device 12 to determine which retail facility 22 that mobile device 12 is entering or has already entered. In example embodiments, the tracking module 34 may receive the tracking data of mobile device 12 to determine what retail store is in closest proximity to mobile device 12. If tracking module 34 cannot determine what retail store mobile device 12 is entering or has entered, tracking module 34 may transmit data to be displayed on GUI 68 of mobile device 12 requesting a consumer select the retail store that they desire to enter or has entered.

Optionally, a product module 33 at the server 30 is configured to receive identification attributes of products offered for sale at the retail facility 22. Such attributes may include title, description, nutrition information, about the product, or the like. Additionally or alternatively, a product module 73 at the mobile device 12 may implement similar techniques.

The database 16 may store any of the map data, tracking data, and/or contextual information 70 relating to the retail facility 22. The database 16 can store information associated with any individual or mobile device 12. For example, the database 16 can store information associated with the consumer account and may include account preferences and consumer contact information. The database 16 may be queried by the processing device 50 and may provide information to the processing device 50 to facilitate generation of the first and second maps 40, 50.

In some examples, the database 16 stores item information associated with items or types of items in the facility 22. For example, the database 16 may store identification codes, UPC codes, item location in the facility 22, as well as other information associated with the items. By way of example, the database 16 may be queried by the processing device 50 and may transmit information to the processing device 50 to facilitate the use of item data.

In some embodiments, the database 16, as described herein, includes any collection of data including hierarchical databases, relational databases, flat file databases, object-relational databases, object oriented databases, and any other structured collection of records or data that is stored in a computer system. The above examples are exemplary only, and thus are not intended to limit in any way the definition and/or meaning of the term database. Examples of databases include, but are not limited to only including, Oracle® Database, MySQL, IBM® DB2, Microsoft® SQL Server, Sybase®, and PostgreSQL. However, any database may be used that enables the systems and methods described herein. (Oracle is a registered trademark of Oracle Corporation, Redwood Shores, Calif.; IBM is a registered trademark of International Business Machines Corporation, Armonk, N.Y.; Microsoft is a registered trademark of Microsoft Corporation, Redmond, Wash.; and Sybase is a registered trademark of Sybase, Dublin, Calif.)

D. Network

Various embodiments, components, and techniques related to the network 20 are described herein. The network 20 may include one or a plurality of networks 20 for facilitating communication between any of the mobile device 12, server 14, and tracking system 18. It will be understood that network 20 may be a combination of multiple different kinds of wired or wireless networks.

Network 20 may include any type of network that is capable of sending and receiving communication signals, including signals for multimedia content, images, data and streaming video. Network 20 may include a data network, such as the Internet, an intranet, a local area network (LAN), a wide area network (WAN), a cable network, and other like systems that are capable of transmitting information, such as digital data, and the like. Network 20 may also include a telecommunications network, such as a local telephone network, long distance telephone network, cellular telephone network, satellite communications network, and other like communications systems that interact with computer systems to enable transmission of information. Network 20 may include a plurality of data networks, a plurality of telecommunications networks, cable systems, satellite systems and/or a combination of data and telecommunications networks and other like communication systems.

The network 20 or any portion thereof may be implemented in cloud computing environments. Cloud computing may be defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction, and then scaled accordingly. A cloud model can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.). Those skilled in the art appreciate that various other network 20 configurations, not specifically recited herein, are possible.

E. Tracking System

The tracking system 18 is configured to acquire tracking data from the mobile device 12 at the retail facility 22. The tracking data may include location, orientation, or any other suitable directional data relating the mobile device 12. Tracking system 18 may be a computing device such as a platform server that is capable of supporting mobile apps. Tracking system 18 may include physical computing devices residing at a particular location, such as a BLE (Bluetooth low energy), VLC (visible light communication), or WiFi mesh devices. Additionally or alternatively, the tracking system 18 may be deployed in a cloud computing network environment. In this description and the following claims, "cloud computing" may be defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction, and then scaled accordingly. A cloud model can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.).

Tracking system 18 may include any combination of one or more computer-usable or computer-readable media. For example, tracking system 18 may include a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. The medium may comprise computer program code for carrying out operations written in any combination of one or more programming languages. Tracking system 18 may include any combination of one or more computer-usable or computer-readable media.

The tracking system 18 determines tracking data via any known means, such as a RTLS, IPS, WiFi, radar, mobile phone tracking, time distance of arrival (TDOA) signals, short wave radio, Bluetooth, visible light communication, etc. Tracking system 18 can perform triangulation techniques to determine the current waypoint of the mobile device 12, and transmit tracking data to said server 14.

In one example embodiment, as shown in FIG. 2, the tracking system 18 may be configured to transmit and receive signals to communication units 80 positioned throughout a retail facility 22. In such embodiments, the tracking system 18 functions as an indoor positioning system. Examples of the communication units 80 are beacons (active transponders) and receivers in the building that collectively function as a private satellite navigation system to calculate position of the mobile device 10 using software implemented by the tracking system 18. The communication units 80 send location ID signals to the mobile device 12 at configurable intervals. The receiver on the mobile device 12 decodes these signals and sends data to the server 14, the tracking system 18 or any other system component(s) (automatically or on request) via GSM, or the like.

It should be appreciated that while one embodiment of the tracking system 18 is shown, any other suitable component for determining the tracking data relating to the mobile device 12 can be implemented.

F. Mapping Techniques

One example of the first map 40 and the second map 50 displayed concurrently on the mobile device 12 is provided in FIG. 5. The first map 40 comprises the entirety of the layout 24. That is, the first map 40 provides an overview of the whole retail facility 22. The layout 24 in the first map 40 need not provide all information relating to the structures, areas, and objects within the facility 22. Any appropriate information may be omitted from the layout 24 for suitable reasons, such as confidentiality, safety, redundancy, or efficiency. As such, the term "entirety" is not intended to limit the first map 40 to including every detail of the layout 24. Rather, the first map 40 is provided to give the user of the mobile device 12 context as to where the user is generally located at the retail facility 22.

As shown in FIG. 5, the second map 50 comprises the zoomed-in portion 52 of the layout 24 that is proximate to the location of the mobile device 12. The second map 50 presents the zoomed-in portion 52 of the first map 50. In this way, the first map 40 provides a high-level overview of the facility 22 while the second map 50 provides a detailed view of the portion 52 of the layout 24 that is zoomed in.

Figure 8:
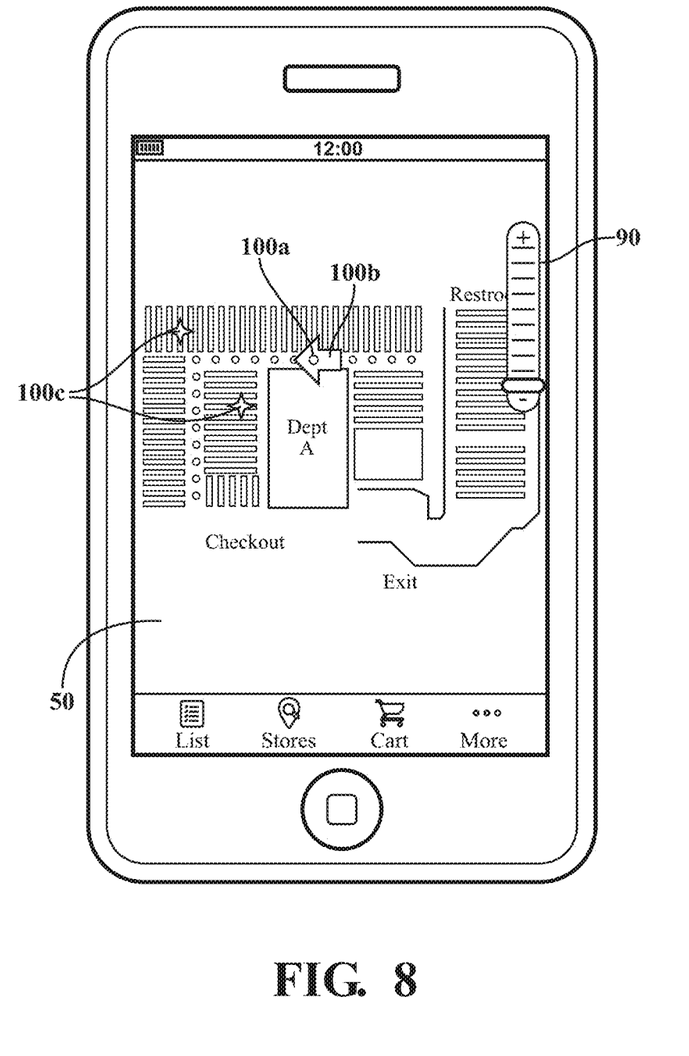
FIG. 8 is a sample screenshot of the display of the mobile device presenting the second map of the retail facility while hiding the first map, according to one embodiment of the method illustrated in FIG. 7.

The second map 50 is configured to have variable zoom such that the user of the mobile device 12 can zoom the second map 50 in or out. In one embodiment, as shown in FIGS. 5 and 8, the GUI 68 provides a zoom interface 90 for allowing the user to specify the zoom level of the second map 50. Generally, the second map 50 has a zoomed-in state for presenting the zoomed-in portion 52, and a zoomed-out state for presenting at least one of a zoomed-out portion of the layout 24 or the entirety of the layout 24.

The zoomed-in portion 52 of the layout 24 is generally focused on an area of the layout 24 that is proximate to the location of the mobile device 12 at the retail facility 22. In one example, proximity may be based on predefined areas surrounding a tracked location of the mobile device 12. The area of the layout 24 presented in the second map 50 varies depending on the zoom-in state. For example, as shown in FIG. 5, when the second map 50 is in the zoomed-in state, a radial distance is approximately 50 feet from the mobile device 12 location is presented. If, for example, the second map 50 is zoomed-in more, a radial distance of approximately 25 feet from the mobile device 12 location may be presented. In other examples, each zoom-in state has a predetermined area of the layout 24 to present. For example, the predetermined areas may be $\frac{1}{80}^{th}$, $\frac{1}{40}^{th}$, $\frac{1}{20}^{th}$, $\frac{1}{10}^{th}$, $\frac{1}{5}^{th}$, $\frac{1}{2}$, etc., of the entirety of the area of the layout 24.

In one embodiment, the first map 40 is configured such that the entirety of the layout 24 presented in the first map 40 is static and independent of changes in the location of the mobile device 12. That is, in this example, the first map 40 remains in a constant state and neither zooms-in, rotates, etc. To the contrary, the second map 50 is configured such that the zoomed-in portion 52 of the layout changes dependent on changes in the location of the mobile device 12. That is, as the mobile device 12 moves throughout the retail facility 22, the portion 52 displayed on the second map 50 may follow the location of the mobile device 12. For instance, the second map 50 may be configured to automatically center the portion 52 presented based on the updated location of the mobile device 12. Additionally, the second map 50 may be configured to automatically rotate the portion 52 presented based on the updated orientation or direction of the mobile device 12, which is representative of the direction that the individual is standing in the facility 22. The orientation information from the tracking data may be utilized to rotate second map 50 accordingly. In other embodiments, the first map 40 may also be configured to account for the location and/or orientation data of the mobile device 12.

Preferably, and as shown in FIG. 5, an area of the first map 40 presented on the display 13 is less than an area of the second map 50 presented on the display 13. For example, the second map 50 may presented substantially in full-screen on the display 13 and whereas the first map 40 is presented within a window 92 displayed over a part of the second map 50. Alternatively, the window 92 may be displayed adjacent to the second map 50. Those skilled in the art appreciate that the first and second maps 40, 50 may be disposed, arranged, or configured in any other suitable configuration not specifically described herein.

In one embodiment, the second map 50 has a resolution that is greater than the resolution of the first map 40 to facilitate the zooming feature of the second map 50. Alternatively, the first map 40 may have a resolution that is greater than the resolution of the second map 50.

In one embodiment, the first map 40 and second map 50 are based on the map data. The map data may specify the layout 24 for the specific retail facility 22 at which the mobile device 12 is located. The map data may also provide the contextual information 70 described herein. Any of the first and second maps 40, 50 may further be based on the tracking data. The tracking data specifies where and how the mobile device 12 is located or oriented at the facility, or the like. In some embodiments, the second map 50 uses the map and tracking data, whereas the first map 50 uses solely the map data. In other embodiments, the first and second maps 40, 50 both use the map and tracking data.

The first and/or second maps 40, 50 may be configured such that graphics 100 related to the contextual information 70 are overlaid thereon. For example, as shown in FIG. 5, the second map 50 displays graphic 100*a*, which denotes the location of the mobile device 12 in the facility 22. In this example, the location is denoted by a pin-point (dot) graphic 100*a*. Graphic 100*b* denotes the orientation of the mobile device 12 in the facility 22. The orientation graphic 100*b* is represented by an arrow, which rotates depending on the detected orientation.

The second map 50 is also configured to display graphics relating to items in the retail facility 22. The items may be items intended to be purchased, or items for which there are sales, and the like. The items may be manually inputted in a shopping list feature 102 of the mobile app or provided from the server 14 in an automated fashion. In either instance, the second map 50 is configured to provide item graphic 100*c*, which denotes the location of the item in the facility 22. The item graphic 100*c* may be denoted by a pin-point. Yet another graphic overlaid on the second map 50 is an advertising graphic 100*d*, which indicates promotions, sales, or other information about items in the retail facility 22. The advertising graphic 100*d* may be associated with any item in the facility 22 or only those items utilized in the shopping list feature 102.

Some graphics 100 may be exclusive to the first map 40. For instance, as shown in FIG. 5, a boundary graphic 100*e* is overlaid on the first map 40. The boundary graphic 100*e* is indicative of a boundary of the second map 50. The boundary graphic 100*e* may define the area of the portion 52 zoomed-in by the second map 50. The boundary graphic 100*e* in on example, defines an exact perimeter of the second map 50. In other instances, the boundary graphic 100*e* defines a general or approximate perimeter of the second map 50 for context. The boundary graphic 100*e* may be a geometrical shape, such as a rectangle (box), circle, or the like. Although, those skilled in the art appreciate that the boundary graphic 100*e* may have any suitable shape, size, style, color, or the like. The boundary graphic 100*e* is configured to move on the first map 40 depending on the location of the mobile device 12. That is, although the layout 24 itself in the first map 40 may remain static, the boundary graphic 100*e* is configured to be positioned on the first map 40 to capture the view of the second map 50, which is keyed to the location of the mobile device 12. The boundary graphic 100*e* may increase or decrease in perimeter/area to reflect to zoom-in state of the second map 50. Off-screen indicator graphics 100*f* may indicate at the perimeter of the second map 50 where places or things are located, beyond the view of the second map 50. For example, as shown in FIG. 5, if department A, is to the west of the tracked location of the mobile device 12, and the department A is currently not visible on the second map 50, the off-screen indicator graphic (arrow) 100f denotes the location of department A. Of course, the off-screen indicator graphic 100f may be hidden as the second map 50 zooms-out making the place or thing visible on the second map 50. The places or things denoted off-screen may be based on automated suggestions or based on user input, for example, through the shopping list feature 102.

Those skilled in the art appreciate that other objects, items, or features of the retail facility 22 may be represented by overlaying graphics 100. Furthermore, any of the graphics 100 described herein in relation to the second map 50 may similarly be presented for the first map 50, and vice-versa. Additionally, any of the graphics 100 described herein may have other suitable shapes, forms, styles, colors, and the like, without departing from the scope of the invention. For instance, graphics 100 may be animated or static. In addition, the graphics 100 may be overlaid according to any suitable method, including, but not limited to layering, image overlay, video overlay, or the like.

The maps 40, 50 as shown throughout the Figures are displayed according to one configuration. However, those skilled in the art appreciate that the maps 40, 50 may be displayed according to any suitable configuration. For example, any of the maps 40, 50 may comprise a grid reference system, any suitable 2-D or 3-D virtual or real images, and the like.

Figure 7:
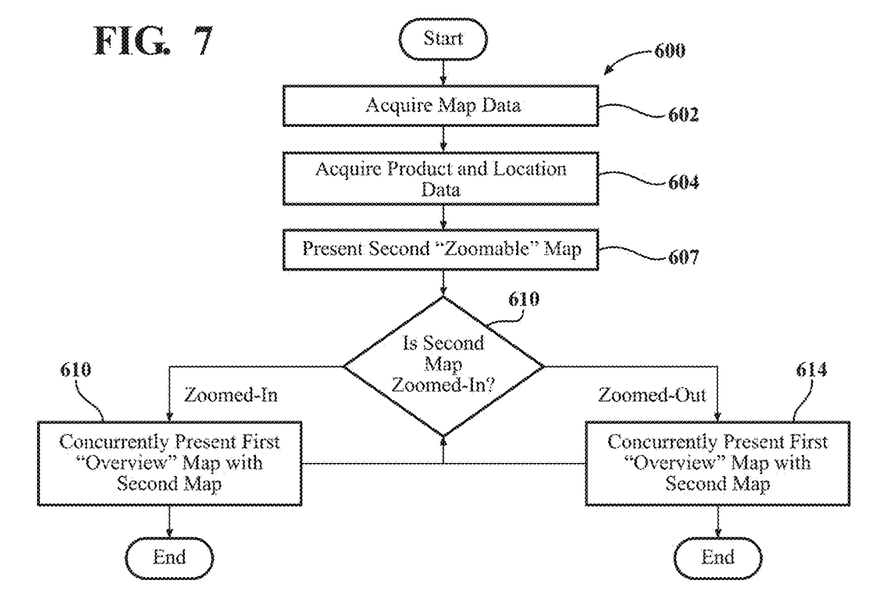
FIG. 7 is a flow diagram of a method for selectively hiding the first map depending on the zoom-state of the second map, according to one embodiment of the present invention.

FIG. 7 illustrates an embodiment of the computer-implemented method 600 wherein the first and second maps 40, 50 are presented according to a specific technique. Here, operations 602 and 604 remain unchanged. That is, the tracking data and map data are still acquired. At operation 607, the second map 50, based on the map data and tracking data, is presented on the display 13 of the mobile device 12, but not necessarily presented concurrently with the first map 40. At operation 610, the processing device(s) 30, 64 of the server 30 and/or mobile device 12 are configured to determine the zoom-state of the second map 50. If it is determined that the second map 50 is in the zoomed-in state at operation 610, the first map 40 and second map 50 are presented on the display 13 of the mobile device 12 concurrently, as shown in FIG. 5. Thereafter, if the mapping is still utilized, the method 600 loops to operation 610 further determine the zoom-state of the second map 50. If on the other hand, at operation 610, it is determined that the second map 50 is in the zoomed-out state, then the first map 40 is hidden at operation 614. Again, if the mapping is still utilized, the method 600 loops to operation 610 from operation 614 to further determine the zoom-state of the second map 50.

FIG. 8 illustrates an example of operation 614, wherein the zoom interface 90 denotes that the second map 50 is zoomed out (−) to the extent that a substantial majority or entirety of the layout 24 is visible on the second map 50. Because of zooming the second map out 50, the first map 40, otherwise presented in the corner (as shown in FIG. 5), becomes hidden from view. The first map 40 may be progressively hidden as the second map 50 progressively zooms out. Alternatively, the first map 40 may be hidden once the second map 50 reaches a predefined zoomed-out state. This feature functions to eliminate redundancy in the first map 40, which shows the entirety of the layout 24, as the second map 50 is zoomed-out to the extent that the entirety of the layout 24 is shown. Of course, this feature is not intended to eliminate the need for the first map 40. Rather, the first map 40 is merely hidden until the second map 50 is zoomed back in.

In some instances, the graphics 100 that are present on the first map 40 when the second map 50 is zoomed-in may also be hidden, as the second map 50 is zoomed-out. Thereafter, as the second map 50 is in the zoomed-out state, the graphics 100 from the first map 40 that are hidden may be temporarily presented on the second map 50. Similarly, the graphics 100 on the second map 50 may be hidden and overlaid on the first map 40 when the second map 50 is returned back to the zoomed-in state. This dynamic transfer of the graphics 100 between the first and second maps 40, 50 provides the user with a convenient and efficient experience when navigating the facility because useful contextual information can be effectively presented whether the second map 50 is zoomed-in or zoomed-out.

Reference throughout this specification to "one embodiment", "an embodiment", "one example" or "an example" means that a particular feature, structure or characteristic described in connection with the embodiment or example is included in at least one embodiment of the present invention. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or sub-combinations in one or more embodiments or examples. In addition, it is appreciated that the figures provided herewith are for explanation purposes to persons ordinarily skilled in the art and that the drawings are not necessarily drawn to scale.

In the preceding description, numerous specific details are set forth in order to provide a thorough understanding of the present disclosure. It will be apparent, however, to one having ordinary skill in the art that the specific detail need not be employed to practice the present disclosure. In other instances, well-known materials or methods have not been described in detail in order to avoid obscuring the present disclosure.

A computing device, server or computer, such as described herein, includes at least one or more processors or processing units and a system memory (see above). Any of the aforementioned devices may include form of computer readable media. By way of example and not limitation, computer readable media may include computer storage media and communication media. Computer storage media may include volatile and nonvolatile, removable and non-removable media implemented in any method or technology that enables storage of information, such as computer readable instructions, data structures, program modules, or other data. Communication media typically embody computer readable instructions, data structures, program modules, or other data in a modulated data signal such as a carrier wave or other transport mechanism and include any information delivery media. Those skilled in the art should be familiar with the modulated data signal, which has one or more of its characteristics set or changed in such a manner as to encode information in the signal. Combinations of any of the above are also included within the scope of computer readable media.

Any combination of one or more computer-usable or computer-readable media (or medium) may be utilized. For example, a computer-readable media may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. Computer program code for carrying out operations of the present invention may be written in any combination of one or more programming languages The flowchart and block diagrams in the flow diagrams illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions. These computer program instructions may also be stored in a computer-readable media that can direct a computer or other programmable data processing apparatus to function in a particular manner, such that the instructions stored in the computer-readable media produce an article of manufacture including instruction means which implement the function/act specified in the flowchart and/or block diagram block or blocks.

Several (or different) elements discussed below, and/or claimed, are described as being "coupled", "in communication with", or "configured to be in communication with". This terminology is intended to be non-limiting, and where appropriate, be interpreted to include without limitation, wired and wireless communication using any one or a plurality of a suitable protocols, as well as communication methods that are constantly maintained, are made on a periodic basis, and/or made or initiated on an as needed basis.

The order of execution or performance of the operations in the embodiments of the invention illustrated and described herein is not essential, unless otherwise specified. That is, the operations described herein may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

The above description of illustrated examples of the present disclosure, including what is described in the Abstract, are not intended to be exhaustive or to be limitation to the precise forms disclosed. While specific embodiments of, and examples for, the disclosure are described herein for illustrative purposes, various equivalent modifications are possible without departing from the broader spirit and scope of the present disclosure. Indeed, it is appreciated that the specific examples are provided for explanation purposes and that other techniques may also be employed in other embodiments and examples in accordance with the teachings of the present disclosure.

The above description of illustrated examples of the present invention, including what is described in the Abstract, are not intended to be exhaustive or to be limitation to the precise forms disclosed. While specific embodiments of, and examples for, the invention are described herein for illustrative purposes, various equivalent modifications are possible without departing from the broader spirit and scope of the present invention.

What is claimed is:

1. A server, comprising:
a tracking system being configured to receive tracking data relating to a location of a mobile device as the mobile device moves through a retail facility;
a database comprising map data relating to a layout of the retail facility; and
a processor configured to:
generate for presentation on a display of the mobile device a first map based on the map data, wherein the first map is static and comprises an entirety of the layout; and
generate for concurrent presentation on the display of the mobile device a second map based on the map data and the tracking data, wherein the second map comprises a zoomed-in portion of the layout of the first map that is proximate to the location of the mobile device, wherein the first map and the second map are displayed on the display of the mobile device at a same time, the zoomed-in portion of the second map changes to follow the location of the mobile device as the mobile device moves through the retail facility, a boundary graphic indicative of a perimeter of the second map is displayed as an overlay over the first map, the overlay changes over the first map as the second map changes, the boundary graphic moves on the first map as the location of the mobile device moves through the retail facility, and the overlay further comprises an indicator graphic that tracks the location of the mobile device within the boundary graphic.

2. The server of claim 1 wherein the tracking system is located at the retail facility.

3. The server of claim 1 wherein the processor is further configured to generate the second map for full-screen presentation on the display of the mobile device and the first map within a window displayed over a part of the second map.

4. The server of claim 1 wherein the processor is further configured to generate the first map such that the layout presented in the first map provides a user of the mobile device context as to where the user is located at the retail facility.

5. The server of claim 1 wherein the processor is further configured to change the zoomed-in portion of the layout presented in the second map by automatically centering the location of the mobile device on the second map based on an updated location of the mobile device.

6. The server of claim 1 wherein the processor is further configured to generate the second map with a variable zoom, with a zoomed-in state for presenting the zoomed-in portion of the first map, and a zoomed-out state for presenting at least one of a zoomed-out portion of the layout of the first map or the entirety of the layout of the first map.

7. The server of claim 6 wherein the processor is further configured to generate the first map for presentation when the second map is in the zoomed-in state, and hide the first map when the second map is in the zoomed-out state.

8. The server of claim 7 wherein the processor is further configured to overlay a graphic on the second map when the second map is in the zoomed-out state, and hide the graphic on the second map and overlay the graphic on the first map when the second map is in the zoomed-in state.

9. The server of claim 8 wherein the graphic is indicative of at least one of an orientation of the mobile device in the retail facility, a location of at least one of an item for sale at the retail facility, an entrance or exit at the retail facility, a checkout station at the retail facility, a restroom at the retail facility, or a department at the retail facility, or advertising or promotional information relating to an item for sale at the retail facility.

10. A computer-implemented method comprising:
acquiring, with a tracking system, tracking data relating to a location of a mobile device as the mobile device moves through a retail facility and map data relating to a layout of the retail facility;
presenting, using a processor, a first map on a display of the mobile device wherein the first map is static based on the map data and comprises an entirety of the layout; and
concurrently presenting, using the processor, a second map on the display of the mobile device wherein the second map is based on the map data and the tracking data and comprises a zoomed-in portion of the layout of the first map that is proximate to the location of the mobile device, wherein the first map and the second map are displayed on the display of the mobile device at a same time, the zoomed-in portion of the second map changes to follow the location of the mobile device as the mobile device moves through the retail facility, a boundary graphic indicative of a perimeter of the second map is displayed as an overlay over the first map, the overlay changes as the second map changes, the boundary graphic moves on the first map as the location of the mobile device moves through the retail facility, and the overlay further comprises an indicator graphic that tracks the location of the mobile device within the boundary graphic.

11. The computer-implemented method of claim 10 wherein the tracking system is located at the retail facility.

12. The computer-implemented method of claim 10 wherein presenting the second map further is further defined as presenting, with the processor, the second map in full-screen on the display and wherein presenting the first map is further defined as presenting, using the processor, the first map within a window displayed over a part of the second map.

13. The computer-implemented method of claim 10 wherein presenting the first map is further defined as presenting, using the processor, the first map such that the layout presented in the first map provides a user of the mobile device context as to where the user is located at the retail facility.

14. The computer-implemented method of claim 10 wherein presenting the second map further is further defined as presenting, using the processor, the second map such that the zoomed-in portion of the layout changes by automatically centering the location of the mobile device on the second map based on an updated location of the mobile device.

15. The computer-implemented method of claim 10 further comprising providing, using the processor, the second map with a variable zoom, with a zoomed-in state for presenting the zoomed-in portion of the first map, and a zoomed-out state for presenting at least one of a zoomed-out portion of the layout of the first map or the entirety of the layout of the first map.

16. The computer-implemented method of claim 15 wherein presenting the first map further occurs when the second map is in the zoomed-in state, and further comprising hiding, using the processor, the first map when the second map is in the zoomed-out state.

17. The computer-implemented method of claim 16 further comprising of:
overlaying, using the processor, a graphic on the second map when the second map is in the zoomed-out state;
hiding, using the processor, the graphic on the second map; and
overlaying, using the processor, the graphic on the first map when the second map is in the zoomed-in state.

18. The computer-implemented method of claim 17 wherein the graphic is indicative of at least one of an orientation of the mobile device in the retail facility, a location of at least one of an item for sale at the retail facility, an entrance or exit at the retail facility, a checkout station at the retail facility, a restroom at the retail facility, or a department at the retail facility, or advertising or promotional information relating to an item for sale at the retail facility.

19. The computer-implemented method of claim 10, wherein:
the indicator graphic that tracks the location of the mobile device inside the boundary graphic comprises an arrow.

20. One or more non-transitory computer-readable storage media, having computer-executable instructions embodied thereon, wherein when executed by at least one processor, the computer-executable instructions cause the processor to:
process tracking data relating to a location of a mobile device as the mobile device moves through a retail facility;
process map data relating to a layout of the retail facility;
facilitate presentation on a display of the mobile device a first map based on the map data, wherein the first map is static and comprises an entirety of the layout; and
concurrently facilitate presentation on the display of the mobile device a second map based on the map data and the tracking data, wherein the second map comprises a zoomed-in portion of the layout of the first map that is proximate to the location of the mobile device, wherein the first map and the second map are displayed on the display of the mobile device at a same time, the zoomed-in portion of the second map changes to follow the location of the mobile device as the mobile device moves through the retail facility, a boundary graphic indicative of a perimeter of the second map is displayed as an overlay over the first map, the overlay changes as the second map changes, the boundary graphic moves on the first map as the location of the mobile device moves through the retail facility, and the overlay further comprises an indicator graphic that tracks the location of the mobile device within the boundary graphic.

* * * * *